June 12, 1951　　　A. J. WEATHERHEAD, JR　　　2,556,308
FAUCET

Filed June 29, 1946　　　　　　　　　　　2 Sheets-Sheet 2

INVENTOR.
ALBERT J. WEATHERHEAD, JR.
BY *Richey & Watts*
ATTORNEYS.

Patented June 12, 1951

2,556,308

UNITED STATES PATENT OFFICE 2,556,308

FAUCET

Albert J. Weatherhead, Jr., Shaker Heights, Ohio, assignor to The Weatherhead Company, Cleveland, Ohio, a corporation of Ohio Application June 29, 1946, Serial No. 680,413

1 Claim. (Cl. 251—77)

This invention relates to a valve, more particularly to a valve adapted to control the flow of liquids at relatively low pressures, such as a faucet for the control of a water supply.

This invention is a modification of the valves shown in my pending application, Serial No. 651,683, filed March 4, 1946, and the device herein disclosed in an improvement in the arrangement shown in said pending application in certain respects.

The valve of the type to which this invention relates is one in which no valve seat need be machined in the valve body and which requires no fibre washer or other deformable washer for engagement with a valve seat to make the closure. Such arrangements invariably leak after a period of time and it is an object of this invention to eliminate such leaking or dripping of the valve by providing a sealing arrangement which will not wear or which need not be jammed against a valve seat to close the valve. I accomplish this object by providing a sealing ring in one of the valve parts which works against a smooth surface on the other valve part so that a sliding action is obtained rather than a jam seating action to provide the seal.

In arrangements of this sort one of the valve parts is usually apertured to establish fluid communication between the inlet and outlet ports and when these apertures pass over the sealing member, pressure has a tendency to extrude the sealing member into the apertures which reduces the life of the sealing member. Accordingly, it is another object of this invention ot increase the life of the sealing member in a valve of this type by arranging the parts so that as the apertures and sealing member are brought into alignment, fluid pressure tends to force the sealing member away from the aperture rather than extrude the member into the aperture.

A further object of this invention is to provide a valve which can be cheaply manufactured and which requires no complex machining operations.

Other objects and advantages of this invention will be apparent as the following description of a preferred embodiment thereof proceeds.

Figure 1:
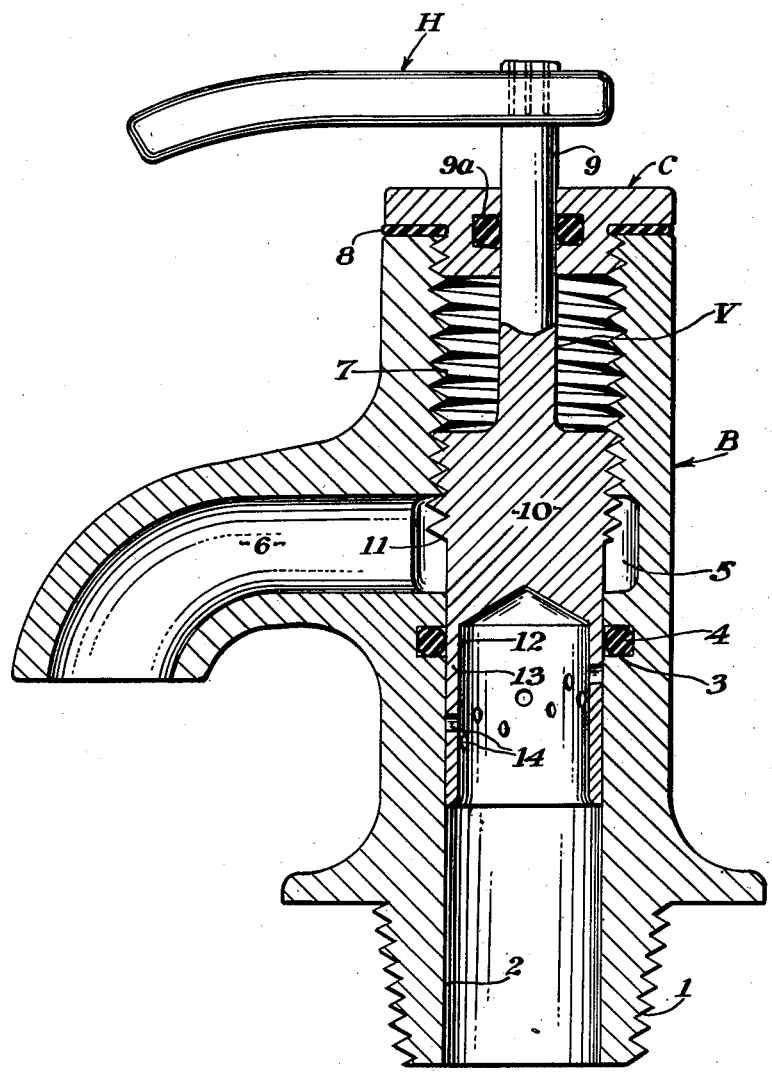
Fig. 1 is a sectional view of a preferred embodiment of my novel valve.

The valve shown in Fig. 1 has a valve body B, a valve or plug member V, cover nut C and a handle H. Valve member B may be threaded as at 1 for connection to the water system and is bored as at 2 to form the inlet port. An upper portion of the body has formed therein a groove 3 into which the sealing ring 4 is fitted. Although any type of sealing member may be used, I have illustrated the conventional O-ring which is one form that operates satisfactorily. An enlarged annular chamber 5 may be machined or cast into the valve body which chamber communicates with the outlet port 6.

The upper portion of the valve body may be internally threaded as at 7 to receive the cap member C and a gasket 8 may be provided therebetween for fluid seal. The valve member V has a stem 9 which is sealed by a sealing ring 9a in the cap C. An O-ring is shown as a sealing member but it is contemplated that any conventional seal or packing may be used. The body or plug portion 10 of valve member V has threads as at 11 to engage threads 7 on the valve body. The lower end of the valve member is counterbored or recessed as at 12 so that a wall portion 13 is formed. A plurality of apertures or passageways 14 are formed in the wall 13 and these apertures may be formed to define an ellipse or a helix and there may be more than one row of apertures. As the valve is opened, the apertures 14 pass over the sealing member and establish communication between the inlet port 2 and the chambers 5 and 6 in the outlet, and as they are gradually opened, the amount of fluid flow is gradually increased.

Figure 2:
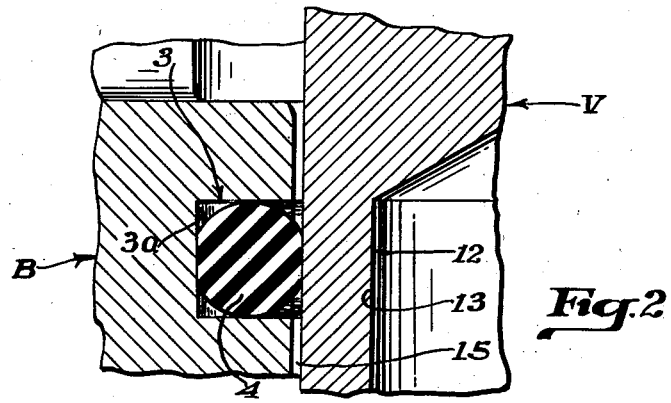
Fig. 2 is an enlarged view of the sealing member when no fluid pressure is present.
Figure 3:
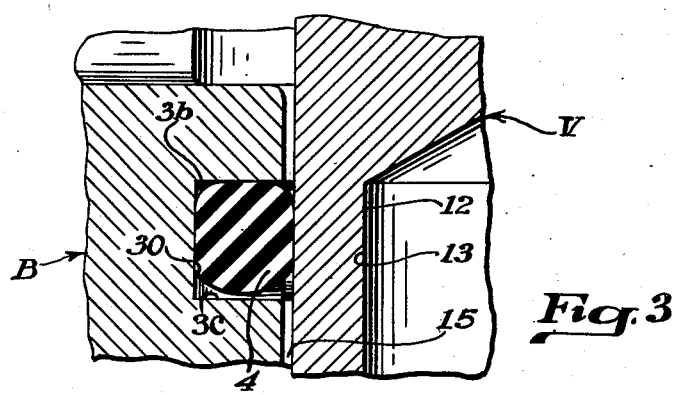
Fig. 3 shows the same member with fluid pressure present.
Figure 4:
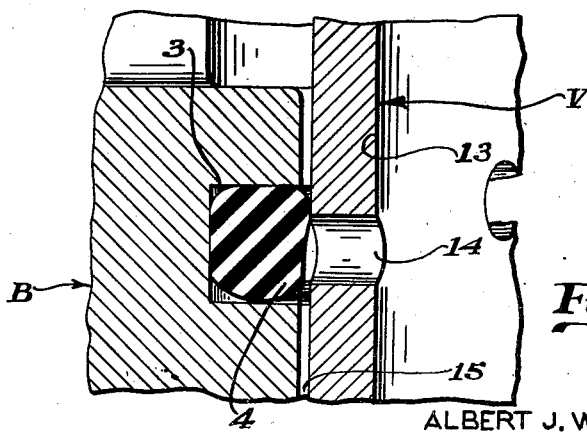
Fig. 4 shows the novel action when one of the apertures is opposite the sealing member.

Reference is made to Figs. 2–4 for a clearer understanding of how pressure aids in increasing the life of the sealing member. In these figures an O-ring seal has been disclosed but it is contemplated that any of the conventional type sealing rings could be substituted without modifying the principle of operation.

In Fig. 2 the usual assembly with an O-ring is shown somewhat enlarged. It will be noted that packing 4 is wider than the groove 3 is deep so that when no fluid pressure is applied the O-ring 4 presses against the valve member V and the bottom wall 3a of the groove.

As seen in Fig. 3, when the fluid pressure is applied it works its way through the clearance space 15 between the members and gets between the wall 3c of the groove and the sealing ring 4 so that the ring is strongly forced against the wall 3b of the groove as well as the wall 3a thereof and it is further pressed against the wall of valve member V. Thus fluid pressure increases the sealing action of the O-ring.

As seen in Fig. 4, when an aperture 14 in the valve member V is opposite the sealing ring 4, the pressure in the chamber of the valve member is transmitted through the passageway 14 and presses against the adjacent wall of the sealing ring 4 tending to force it away from the edge of the aperture 14, thereby cutting down on the wear of the sealing ring at that point. In this manner it can be seen that the novel arrangement and relationship of the parts disclosed in this invention is such that there is little or no danger of extrusion of the sealing member into the communicating passageway 14 with the attendant cutting and abrading action.

I contemplate that various modifications may be made without affecting the essence of the invention disclosed in the specification and drawings. The method whereby the valve member 10 is threaded to the valve body may be modified without affecting the operation of the sealing member and the valve member. Likewise, the pipe threads shown at 1 may be replaced with any conventional means for attaching the valve without departing from the spirit of the invention. These and other modifications may be made without departing from the spirit of the invention as defined in the appended claim.

Having thus described an embodiment of the present invention so that others skilled in the art may be able to understand and practice the same, I state that what I desire to secure by Letters Patent is defined in what is claimed.

What I claim is:

A faucet comprising a valve body member having inlet and outlet ports with a chamber therebetween having a cylindrical wall, a valve plug member having a cylindrical wall movable in said chamber the lower surface of said plug member having a surface open to said inlet port, an annular groove in said body member opening toward the cylindrical wall of said plug member, a resilient rubber-like sealing ring in said groove said ring being radially deformed between the bottom wall of said groove and an opposed cylindrical wall of said plug member, passageway means in said plug member between the lower surface thereof and the surface of the cylindrical wall thereof to establish communication between said ports, said valve member being positionable to a closed position wherein said sealing ring, the side wall of said groove remote from said inlet port, and an opposed cylindrical wall portion of said chamber define an annular space into which a portion of said sealing ring at a side remote from said inlet may be deformed as a result of inlet fluid pressure exerted on the opposite side of said sealing ring, to block communication between said ports, said valve member being movable toward an open position wherein said passageway means overlies said deformed ring portion wherein tendency of fluid pressure on said opposite side of said ring to deform the ring is balanced by inlet fluid pressure in said passageway means, thereby establishing communication between said ports and preventing mutilation of said ring by the edges of said passageway means.

ALBERT J. WEATHERHEAD, Jr.

REFERENCES CITED

The following references are of record in the file of this patent:

UNITED STATES PATENTS

| Number | Name | Date |
|---|---|---|
| 2,010,329 | Speth | Aug. 6, 1935 |
| 2,132,030 | Hunt | Oct. 4, 1938 |
| 2,360,733 | Smith | Oct. 17, 1944 |

FOREIGN PATENTS

| Number | Country | Date |
|---|---|---|
| 8,847 | Sweden | of 1898 |
| 13,850 | Great Britain | of 1895 |
| 356,377 | Great Britain | of 1930 |
| 483,024 | Germany | of 1929 |